(12) United States Patent
Nishimaki

(10) Patent No.: US 6,870,354 B2
(45) Date of Patent: Mar. 22, 2005

(54) POWER SOURCE CIRCUIT

(75) Inventor: Tatsuo Nishimaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 10/623,276

(22) Filed: Jul. 18, 2003

(65) Prior Publication Data
US 2004/0104714 A1 Jun. 3, 2004

(30) Foreign Application Priority Data
Jul. 24, 2002 (JP) ........................................ 2002-215245

(51) Int. Cl.$^7$ ................................................ G05F 1/40
(52) U.S. Cl. ........................ 323/284; 323/282; 323/224
(58) Field of Search ................................ 323/284, 283, 323/282, 224

(56) References Cited

U.S. PATENT DOCUMENTS 6,366,070 B1 * 4/2002 Cooke et al. ............... 323/284

FOREIGN PATENT DOCUMENTS

| JP | 2000-092824 | 3/2000 |
| JP | 2001-037213 | 2/2001 |

* cited by examiner

Primary Examiner—Shawn Riley
(74) Attorney, Agent, or Firm—Hogan & Hartson, LLP

(57) ABSTRACT

A power source circuit includes a CMOS inversion circuit including a P-channel transistor and an N-channel transistor connected in series between a power source voltage and a reference potential, the transistors being alternately turned "on" or "off" by a PWM signal input to a gate of each transistor with an "on" period of the transistors being controlled, and being capable of outputting a D.C. voltage to a load via a stabilized capacitance. The circuit also includes a detection circuit outputting a detection signal showing a state where an intermediate node potential at a connection point of the P-channel transistor and the N-channel transistor surpasses the reference potential after undershooting to a level lower than the reference potential when the N-channel transistor is turned "on" during the "off" period of the P-channel transistor. An error amplifier is provided that obtains an error signal by comparing an output from the CMOS inversion circuit with a predetermined reference voltage value. A PWM circuit and output driver are provided that produce a PWM signal of which a pulse width is controlled by the error signal, supplying the PWM signal to each gate of the CMOS inversion circuit, controlling the PWM signal supplied to the gate of the N-channel transistor among PWM signals supplied to the CMOS inversion circuit by the detection signal from the detection circuit, and turning "off" an "on" state of the N-channel transistor.

20 Claims, 9 Drawing Sheets

POWER SOURCE CIRCUIT

BACKGROUND OF THE INVENTION

1. Technical Field of the Invention

The present invention relates to a power source circuit, in particular, a power source circuit, which can reduce power consumption and respond to load fluctuations at high speeds among power source integrated circuits of synchronous rectification systems using a complementary metal oxide semiconductor (CMOS) integrated circuit.

2. Description of the Related Art

Recently, mobile devices such as cellular phones have become widely used and the opportunities for driving a circuit being a load with a battery have been increasing such that it is essential that the power consumption of a power source circuit be small. Further, it is also essential that a power source circuit can respond to load fluctuations at high speeds.

In particular, the stabilized D.C. power source having a low voltage and low power consumption is required along with popularization of electronic equipment using integrated circuits.

If a power source is stabilized by a switch action of turning transistors "on" and "off" in response to fluctuations in the load and/or input, power consumed wastefully can be reduced such that the efficiency of the power is greatly improved. That is, changing the "on" period (or "on" duty) of the transistors can stabilize power source. As such, an efficient power source circuit, a synchronous rectification type switching regulator using a CMOS integrated circuit exists.

A CMOS integrated circuit is configured by using a combination of the two kinds of transistors of N-channel transistor (abbreviated to NMOS hereafter) and P-channel transistor (abbreviated to PMOS hereafter), and is the mainstream of the large scale integration (LSI) technique due to its low power consumption characteristic.

The configuration of a synchronous rectification type switching regulator using CMOS integrated circuit is shown in FIG. 14.

In FIG. 14, the power source circuit includes a synchronous rectification type CMOS inversion circuit including a PMOS (QP1) which is a high side transistor and a NMOS (QN1) which is a low side transistor and turning "on" or "off" the transistors alternately to output a D.C. voltage VOUT; an error amplifier 63 obtaining an error signal by comparing the output voltage from the CMOS inversion circuit with the reference voltage value of a reference voltage supply E; and an PWM circuit 61 controlling the output from the CMOS inversion circuit to be constant by controlling the pulse width of a Pulse Width Modulation signal based on the error signal.

The PWM circuit 61 outputs high frequency wave (for example, 1 MHz) pulses SH and SL which are approximately synchronized with each other and have appropriate pulse widths to apply the pulses to each gate of the PMOS (QP1) and the NMOS (QN1). The high frequency wave pulses SH and SL are such pulses as shown in FIG. 15(a) and (b) respectively. The transistors, the PMOS (QP1) and the NMOS (QN1), are connected in series as these drains D being in common between a terminal 24 to which a D.C. voltage VIN (equal to power source voltage VDD, for example, 4V) is supplied as a input voltage and a terminal 25 supplying a reference potential VSS (for example, 0.3V), and each transistor is turned "on" and "off" alternately by the high frequency wave pulses SH and SL which are approximately synchronized, thereby producing an A.C. voltage VMA as shown in FIG. 15(c) at the intermediate node K, which is the connection point. When the NMOS (QN1) is turned "on" during the "off" period of the PMOS (QP1), the intermediate node potential VMA once undershoot to a potential lower than the reference potential VSS and then returns from the undershot state to intersect with the VSS level at point P. The intermediate node potential VMA thereafter rises over the VSS level.

Here, the reason why the gate pulse SL supplied to the gate of the NMOS (QN1) is slightly delayed against the gate pulse SH of the PMOS (QP1) in FIG. 15(a), (b) is that the NMOS (QN1) is turned "on" after the PMOS (QP1) is certainly turned "off", thereby preventing a through current from flowing from a power source VIN side to a reference potential VSS side by turning the PMOS and the NMOS "on" at the same time. In addition, a Schottky diode SD is connected between a source and a drain of the NMOS (QN1), thereby implementing an overvoltage protection of the NMOS and power supply backup when the NMOS is "off".

A coil for rectification L1 and a stabilized capacitance C0 are connected in series between the intermediate node K and a terminal 26 giving the reference potential VSS so as to output a D.C. voltage VOUT smoothed by the stabilized capacitance C0 to an output terminal 27 connected to the series connection point. Further, the output voltage VOUT is fed back to one terminal of the error amplifier 63 via a feedback line so as to be compared with the reference voltage value at the reference voltage supply E connected to a terminal 28 giving the reference potential VSS. The error output, which is the result of the comparison by the error amplifier 63, is supplied to the PWM circuit 61 to control the pulse width of the PWM signal that the PWM circuit 61 produces by the error output. The output voltage VOUT (for example, 1.5V) supplied to a load not shown in the drawing is controlled to be constant all the time by this feedback control.

On the other hand, when a load of the regulator output VOUT rapidly changes, the PWM of a switching regulator must be also controlled in accordance with a load. Generally, when the feedback is from the output voltage VOUT responsiveness is low. Hence, the responsiveness to a load is improved by controlling in response to the change of the load current. Generally, the change in the current is monitored by providing a resistor or the like with an external regulator output stage.

For example, as shown in FIG. 16, a resistor for current detection RS is provided between the coil L1 and the output terminal 27 to amplify the potential difference across the resistor RS by an amplifier 62 and feed back to one terminal of the error amplifier 63. Or, the resistor for current detection RS is provided between the source S of the PMOS (QN1) and the terminal 24 to which the D.C. voltage VIN is input to feed back the potential difference across the resistor RS.

Meanwhile, in the power source circuit shown in FIG. 14, the waveform of the voltage VMA at the intermediate node K between the PMOS (QP1) and the NMOS (QN1) during operation is in the manner shown in FIG. 15(c). The NMOS (QN1) is turned "on" during the "off" period of the PMOS (QP1), thereby supplying power from the NMOS side to a load. Whereat, the potential of the intermediate node voltage VMA becomes lower than the reference potential VSS such that current flows from the reference potential VSS side to the intermediate node K side (namely, a load side).

However, when current consumption is small, namely, a load is light, there is a problem that the intermediate node potential VMA returns from the undershooting state to rise over the reference potential VSS during the "off" period of the NMOS (QN1) and current flows from the intermediate node K to the VSS side (namely, current flowing backward) such that power is consumed. Hence, controlling the NMOS (QN1) to be turned "off" is required.

On the other hand, though responsiveness to a load is improved by PWM control in response to the change of the load current, if the current change is monitored by providing a resistor or the like with an external regulator output stage, such providing a resistor causes problems that the component parts of the resistor causes a large increase in the number of component parts and the efficiency decrease due to loss at the resistor.

Therefore, an advantage of the present invention is to provide a power source circuit that can reduce power consumption and respond to load fluctuations at high speeds without an increase in the number of component parts and decreased efficiency in a power source circuit of a synchronous rectification system.

SUMMARY OF THE INVENTION

A power source circuit according to the present invention includes a CMOS inversion circuit including a P-channel transistor and an N-channel transistor connected in series between a power source voltage and a reference potential, turning "on" or "off" the transistors alternately by a PWM signal input to a gate of each transistor with the "on" period of the transistors being controlled, and being capable of outputting a D.C. voltage to a load via a stabilized capacitance The circuit also includes a detection circuit outputting a detection signal showing the state where a potential (referred to as intermediate node potential hereafter) at a connection point of the P-channel transistor and the N-channel transistor surpasses the reference potential after undershooting to a level lower than the reference potential when the N-channel transistor is turned "on" during the "off" period of the P-channel transistor and an error detection means obtaining an error signal by comparing the output from the CMOS inversion circuit with a predetermined reference voltage. The circuit further includes a PWM means producing a PWM signal of which a pulse width is controlled by the error signal, supplying the PWM signal to each gate of the CMOS inversion circuit, controlling the PWM signal supplied to the gate of the N-channel transistor among the PWM signals supplied to the CMOS inversion circuit by the detection signal from the detection circuit, and turning "off" the "on" state of the N-channel transistor.

According to this configuration of the present invention, in a unit of the CMOS inversion circuit, after the P-channel transistor is turned "off", the N-channel transistor is turned "on" such that the intermediate node potential declines and undershoots to the potential lower than the reference potential. Then, if the intermediate node potential returns to the reference potential from the undershot state, the N-channel transistor is compulsorily turned "off" (namely, making the gate voltage of the N-channel transistor low). This can avoid unnecessary power consumption due to current flowing from the intermediate node side to the reference potential side when the intermediate node potential returns from the undershot state and surpasses the reference potential level.

Further, according to the present invention, it is preferable that the detection circuit includes a first switch being capable of switching the intermediate node potential to the reference potential selectively, and selecting and outputting the intermediate node potential during the "on" period of the N-channel transistor and a coupling capacitor connected to an output terminal of the first switch in series. The detection circuit also includes an inverter connected to the output terminal of the coupling capacitor in series, driven by using the same voltage as the power source voltage and the reference potential, inputting and inverting the intermediate node potential during the "on" period of the N-channel transistor, and outputting the intermediate node potential as the detection signal and a second switch connected to input and output terminals of the inverter in parallel, being turned "on" during the "on" period of the P-channel transistor, and being turned "off" during the "on" period of the N-channel transistor.

According to this configuration, the timing when the intermediate node potential returns from the undershot state and rises to surpass the reference potential can be detected at a high speed by using the inversion circuit such that the N-channel transistor can be quickly turned "off" without delay. Therefore, even if the timing (zero point position) when the intermediate node potential returns to the reference potential from the undershooting state fluctuates due to the fluctuation of a load current, the timing can be certainly detected such that accurate and high speed operation is possible.

Further, the power source circuit according to the present invention includes a CMOS inversion circuit including a P-channel transistor and an N-channel transistor connected in series between a power source voltage and a reference potential, turning "on" or "off" the transistors alternately by a PWM signal input to a gate of each transistor with the "on" period of the transistors being controlled, and being capable of outputting a D.C. voltage to a load via a stabilized capacitance and a detection circuit detecting the timing (referred to as zero point position hereafter) when potential at a connection point of the P-channel transistor and the N-channel transistor returns to the reference potential after undershooting to a level lower than the reference potential, and outputting a detection signal that shows at least the zero point position when the N-channel transistor is turned "on" during the "off" period of the P-channel transistor. The circuit also includes a current feedback circuit producing a current feedback signal according to the magnitude of a load current on the basis of the detection signal showing the zero point position, an error detection means obtaining an error signal by comparing the current feedback signal with a predetermined reference voltage value, and a PWM means producing a PWM signal of which a pulse width is controlled by the error signal, and supplying the PWM signal to each gate of the CMOS inversion circuit.

According to this configuration of the present invention, a resistor for a current detection included in a conventional circuit is not required such that the large increase in the number of component parts of resistors and power loss (efficiency decrease) of a resistor for detection can be avoided.

In addition, the power source circuit according to the present invention includes a CMOS inversion circuit including a P-channel transistor and an N-channel transistor connected in series between a power source voltage and a reference potential, turning "on" or "off" the transistors alternately by a PWM signal input to a gate of each transistor with the "on" period of the transistors being controlled, and being capable of outputting a D.C. voltage to a load via a stabilized capacitance. The circuit also includes a detection circuit outputting a first detection signal showing the state where a potential at a connection point of the P-channel transistor and the N-channel transistor surpasses the reference potential after undershooting to a level lower than the reference potential, at the same time, detecting the timing (referred to as zero point position hereafter) when the potential at the connection point returns to the reference potential after undershooting to the level lower than the reference potential, and outputting a second detection signal that shows at least the zero point position when the N-channel transistor is turned "on" during the "off" period of the P-channel transistor. The circuit also includes a current feedback circuit producing a current feedback signal according to the magnitude of the load current on the basis of the second detection signal showing the zero point position, an error detection means obtaining an error signal by comparing the current feedback signal with a predetermined reference voltage value; and a PWM means producing a PWM signal of which a pulse width is controlled by the error signal, supplying the PWM signal to each gate of the CMOS inversion circuit, controlling the PWM signal supplied to the gate of the N-channel transistor among the PWM signals supplied to the CMOS inversion circuit by the first detection signal from the detection circuit, and turning "off" an "on" state of the N-channel transistor.

According to this configuration of the present invention, in a unit of the CMOS inversion circuit, after the P-channel transistor is turned "off", the N-channel transistor is turned "on" such that the intermediate node potential declines and undershoots to the potential lower than the reference potential. Then, if the intermediate node potential returns to the reference potential from the undershot state, the N-channel transistor is compulsorily turned "off" (namely, making the gate voltage of the N-channel transistor low). This can avoid unnecessary power consumption due to the current flowing from the intermediate node side to the reference potential side when the intermediate node potential returns from the undershot state and surpasses the reference potential level. In addition, a resistor for current detection included in a conventional circuit is not required such that the large increase in the number of component parts of resistors and power loss (efficiency decrease) of the resistors for detection can be avoided.

In addition, the power source circuit according to the present invention includes a DC-DC conversion circuit including a high side transistor and a low side transistor connected in series between a power source voltage and a reference potential, turning "on" or "off" the transistors alternately by a PWM signal input to a gate of each transistor with the "on" period of the transistors being controlled, and being capable of outputting a D.C. voltage to a load via a stabilized capacitance The circuit also includes a detection circuit outputting a detection signal showing the state where an intermediate node potential at a connection point of the high side transistor and the low side transistor surpasses the reference potential after undershooting to a level lower than the reference potential when the low side transistor is turned "on" during the "off" period of the high side transistor. The circuit further includes a PWM means controlling the PWM signal supplied to the gate of the low side transistor among the PWM signals supplied to the DC-DC conversion circuit by the detection signal from the detection circuit, and turning "off" an "on" state of the low side transistor.

According to this configuration of the present invention, in a unit of the DC-DC conversion circuit, after the high side transistor is turned "off", the low side transistor is turned "on" such that the intermediate node potential declines and undershoots to the potential lower than the reference potential. Then, if the intermediate node potential returns to the reference potential from the undershot state, the N-channel transistor is compulsorily turned "off" (namely, making the gate voltage of the low side transistor low). This can avoid unnecessary power consumption due to current flowing from the intermediate node side to the reference potential side when the intermediate node potential returns from the undershooting state and surpasses the reference potential level.

In addition, the power source circuit according to the present invention includes a DC-DC conversion circuit including a high side transistor and a low side transistor connected in series between a power source voltage and a reference potential, turning "on" or "off" the transistors alternately by a PWM signal input to a gate of each transistor with the "on" period of the transistors being controlled, and being capable of outputting a D.C. voltage to a load via a stabilized capacitance. The circuit also includes a detection circuit outputting a detection signal showing the state where an intermediate node potential at a connection point of the high side transistor and the low side transistor surpasses the reference potential after undershooting to a level lower than the reference potential when the low side transistor is turned "on" during the "off" period of the high side transistor. An error detection means for obtaining an error signal by comparing the output from the DC-DC conversion circuit with a predetermined reference voltage value is also provided. A PWM means is included for producing a PWM signal of which pulse width is controlled by the error signal, supplying the PWM signal to each gate of the DC-DC conversion circuit, controlling the PWM signal supplied to the gate of the low side transistor among the PWM signals supplied to the DC-DC conversion circuit by the detection signal from the detection circuit, and turning "off" an "on" state of the low side transistor.

According to this configuration of the present invention, in a unit of DC-DC conversion circuit, after the high side transistor is turned "off", the low side transistor is turned "on" such that the intermediate node potential declines and undershoots to the potential lower than the reference potential. Then, if the intermediate node potential returns to the reference potential from the undershot state, the low side transistor is compulsorily turned "off" (namely, making the gate voltage of the low side transistor low). This can avoid unnecessary power consumption due to current flowing from the intermediate node side to the reference potential side when the intermediate node potential returns from the undershot state and surpasses the reference potential level.

Further, according to the present invention, it is preferable that the detection circuit includes a first switch being capable of switching the intermediate node potential to the reference potential selectively, and selecting and outputting the intermediate node potential during the "on" period of the low side transistor and a coupling capacitor connected to the output terminal of the first switch in series. The circuit also includes an inverter connected to the output terminal of the coupling capacitor in series, driven by using the same voltage as the power source voltage and the reference potential, inputting and inverting the intermediate node potential during the "on" period of the low side transistor, and outputting the intermediate node potential as the detection signal. The circuit further includes a second switch connected to input and output terminals of the inverter in parallel, being turned "on" during the "on" period of the high side transistor, and being turned "off" during the "on" period of the low side transistor.

According to this configuration, the timing when the intermediate node potential returns from the undershot state and rises to surpass the reference potential can be detected at a high speed by using the inverter circuit such that the low side transistor can be quickly turned "off" without delay. Therefore, even if the timing (zero point position) when the intermediate node potential returns to the reference potential from the undershooting state fluctuates due to the fluctuation of the load current, the timing can be certainly detected such that an accurate and high speed operation is possible.

In addition, the power source circuit according to the present invention includes a DC-DC conversion circuit including a high side transistor and a low side transistor connected in series between a power source voltage and a reference potential, turning "on" or "off" the transistors alternately by a PWM signal input to a gate of each transistor with the "on" period of the transistors being controlled, and being capable of outputting a D.C. voltage to a load via a stabilized capacitance and a detection circuit detecting the timing (referred to as zero point position hereafter) when a potential at a connection point of the high side transistor and the low side transistor returns to the reference potential after undershooting to a level lower than the reference potential, and outputting a detection signal that shows at least the zero point position when the low side transistor is turned "on" during the "off" period of the high side transistor. The circuit also includes a current feedback circuit producing a current feedback signal according to the magnitude of a load current on the basis of the detection signal showing the zero point position; an error detection means obtaining an error signal by comparing the current feedback signal with a predetermined reference voltage value; and a PWM means producing a PWM signal of which a pulse width is controlled by the error signal, and supplying the PWM signal to each gate of the DC-DC conversion circuit.

According to this configuration of the present invention, a resistor for current detection included in a conventional circuit is not required such that the large increase in the number of component parts of resistors and power loss (efficiency decrease) of the resistor for detection can be avoided.

In addition, the power source circuit according to the present invention includes a DC-DC conversion circuit including a high side transistor and a low side transistor connected in series between a power source voltage and a reference potential, turning "on" or "off" the transistors alternately by a PWM signal input to a gate of each transistor with the "on" period of the transistors being controlled, and being capable of outputting a D.C. voltage to a load via a stabilized capacitance. The circuit also includes a detection circuit outputting a first detection signal showing the state where a potential at a connection point of the high side transistor and the low side transistor surpasses the reference potential after undershooting to a level lower than the reference potential, at the same time, detecting the timing (referred to as zero point position hereafter) when the potential at the connection point returns to the reference potential after undershooting to the level lower than the reference potential. The circuit also outputs a second detection signal that shows at least the zero point position when the low side transistor is turned "on" during the "off" period of the high side transistor. A current feedback circuit is provided that produces a current feedback signal according to the magnitude of a load current on the basis of the second detection signal showing the zero point position. The circuit further includes an error detection means obtaining an error signal by comparing the current feedback signal with a predetermined reference voltage value and a PWM means producing a PWM signal of which a pulse width is controlled by the error signal, supplying the PWM signal to each gate of the DC-DC conversion circuit, at the same time, controlling the PWM signal supplied to the gate of the low side transistor among the PWM signals supplied to the DC-DC conversion circuit by the first detection signal from the detection circuit, and turning "off" an "on" state of the low side transistor.

According to this configuration of the present invention, in a unit of a DC-DC conversion circuit, after the high side transistor is turned "off", the low side transistor is turned "on" such that the intermediate node potential declines and undershoots to the potential lower than the reference potential. Then, if the intermediate node potential returns to the reference potential from the undershot state, the low side transistor is compulsorily turned "off" (namely, making the gate voltage of the low side transistor low). This can avoid unnecessary power consumption due to current flowing from the intermediate node side to the reference potential side when the intermediate node potential returns from the undershot state and surpasses the reference potential level. In addition, a resistor for current detection included in a conventional circuit is not required as in conventional circuits such that the large increase in the number of component parts of resistors and power loss (efficiency decrease) of resistors for detection can be avoided.

Further, according to the present invention, it is preferable that the current feedback circuit implements current feedback by producing the current feedback signal on the basis of the detection signal showing the zero point position only when the magnitude of a load current is larger than a predetermined value.

According to this configuration, the power source circuit functions of suppressing the fluctuation of the regulator output by producing the current feedback signal only when the magnitude of the load current surpasses a predetermined value such that simple feedback control can be realized.

DETAILED DESCRIPTION OF THE PREFERRED EMBODIMENTS

Embodiments of the present invention will now be described with reference to drawings.

Figure 1:
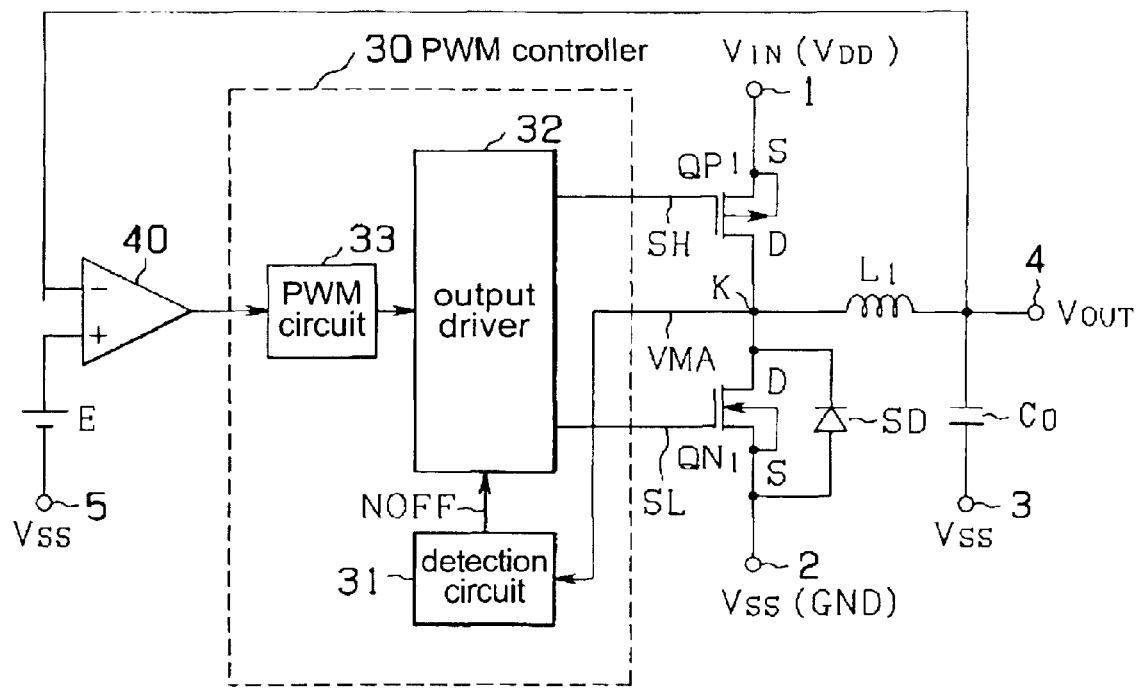
FIG. 1 is a diagram showing a configuration of the power source circuit according to the first embodiment of the present invention.

FIG. 1 shows the configuration of the power source circuit according to a first embodiment of the present invention. The present embodiment shows a synchronous rectification type switching regulator using a CMOS integrated circuit as an efficient stabilized D.C. power source.

In FIG. 1, the power source circuit includes a synchronous rectification type CMOS inversion circuit including PMOS (QP1) as a high side transistor and NMOS (QN1) as a low side transistor, turning "on" or "off" the transistors alternately and outputting a D.C. voltage VOUT; an error amplifier 40 obtaining an error signal by comparing the output voltage from the CMOS inversion circuit with the reference voltage value of the reference voltage supply E; and a PWM controller 30 controlling the output from the CMOS inversion circuit to be constant by controlling the pulse width of the PWM signal on the basis of the error signal. The CMOS inversion circuit configures the DC-DC conversion circuit to which the D.C. voltage VIN is input and which converts VIN to appropriate D.C. voltage VOUT and outputs the voltaew.

In the CMOS inversion circuit, the transistors, PMOS (QP1) and NMOS (QN1), are connected in series as a drain D being in common between a terminal 1 to which the D.C. voltage VIN (=power source voltage VDD, for example, 4V) being the input voltage is supplied and a terminal 2 to which the reference potential VSS (=ground potential GND, for example, 0.3V) is given. The source of the PMOS (QP1) is connected to the terminal 1, and the source of the NMOS (QN1) is connected to the terminal 2.

Gates of the PMOS (QP1) and the NMOS (QN1) are supplied with the high frequency wave pulses SH and SL as PWM signals, respectively, from the PWM controller 30 such that each transistor is turned "on" and "off" alternately by the high frequency wave pulses SH and SL, thereby producing A.C. voltage VMA to intermediate node K being the connection point of the two transistors.

Here, as shown in FIG. 2(a) and (b), the gate pulse SL to the NMOS (QN1) is slightly delayed against the gate pulse SH to the PMOS (QP1) such that the NMOS (QN1) is turned "on" after the PMOS (QP1) is certainly turned "off" so as to prevent a through current from flowing from the power source VIN side to the reference potential VSS side due to simultaneously turning "on" the PMOS and the NMOS. Further, a Schottky diode SD is connected between the source and the drain of the NMOS (QN1), thereby implementing an overvoltage protection of the low side NMOS and power supply backup when the NMOS is turned "off".

The coil for rectification L1 and the stabilized capacitance C0 are connected in series between the intermediate node K to which the A.C. voltage VMA is produced and a terminal 3 to which the reference potential VSS is given, and the D.C. voltage VOUT (for example, 1.5V) smoothed by the stabilized capacitance C0 is an output to a output terminal 4 connected to the series connection point and is supplied to a load not shown in the drawing.

Further, the output D.C. voltage VOUT is fed back to one terminal of the error amplifier 40 via a feedback line so as to be compared with the reference voltage value at the reference voltage supply E connected to a terminal 5 to which the reference voltage VSS is given.

The error voltage is the result of the comparison by an error amplifier 40 supplied to the PWM controller 30 such that the pulse width of the PWM signal, which a PWM circuit 33 produces, is controlled by the error voltage.

The PWM controller 30 includes a PWM circuit 33 producing a PWM signal of which pulse width is controlled on the basis of an error output from the error amplifier 40 and a detection circuit 31 outputting a detection signal NOFF by detecting the state where the potential VMA at the intermediate node K returns from the undershot state after undershooting to a potential lower than the VSS level, reaches the VSS level and rises further, when the NMOS (QN1) is "on" during the "off" period of the PMOS (QP1). The controller also includes an output driver 32 controlling the pulse width of the PWM signal SL which is related to "on" and "off" of the NMOS (QN1) among the PWM signals SH and SL which are supplied to the CMOS inversion circuit by the detection signal NOFF and controlling the NMOS (QN1) in the "on" state to be turned "off" when the NMOS (QN1) is "on" during the "off" period of the PMOS (QP1). Here, the PWM circuit 33 and the output driver 32 configure PWM means.

Next, circuit operation shown in FIG. 1 will now be described with reference to FIG. 2 through FIG. 4.

Figure 2:
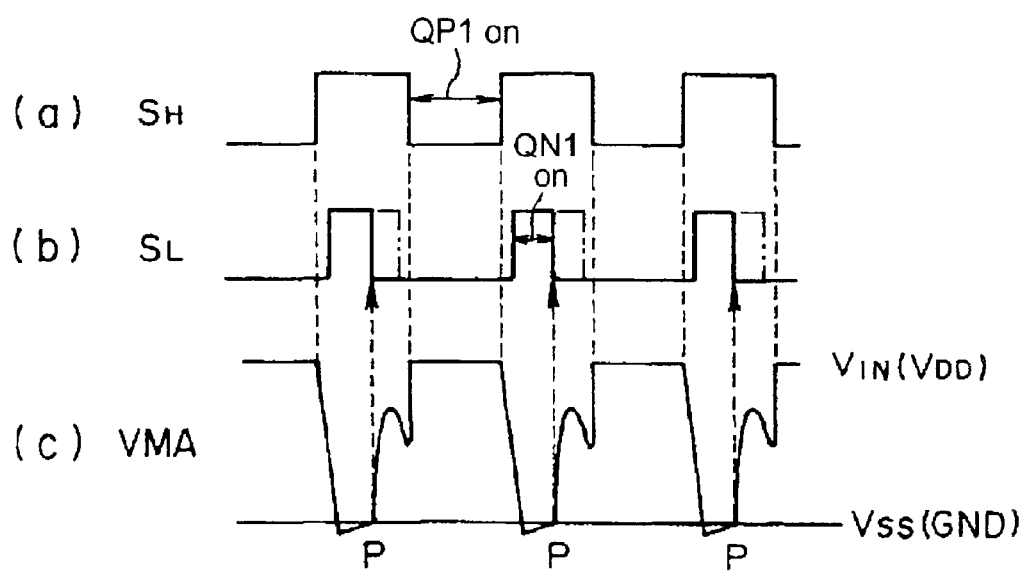
FIG. 2 is a timing diagram showing the changes of PWM signals SH, SL and intermediate node potential VMA in FIG. 1.

FIG. 2 shows a timing diagram showing the change in PWM signals SH, SL and intermediate node potential VMA. FIG. 2(a), FIG. 2(b) and FIG. 2(c) show PWM signal SH, PWM signal SL and intermediate node potential VMA respectively. FIG. 3 is a magnified diagram of enlarging FIG. 2(c). FIG. 4 shows a timing diagram showing the relation between the reference potential VSS, the intermediate node potential VMA and the detection signal NOFF from the detection circuit 31. FIG. 4(a) shows the state of change in the intermediate node potential VMA with reference to the reference potential VSS (when a load is light) when the NMOS is "on" during the "off" period of the PMOS, and FIG. 4(b) shows the detection signal NOFF produced from the detection circuit 31 on the basis of VMA and VSS.

The gates of the PMOS (QP1) and the NMOS (QN1) are supplied with the high frequency wave pulses SH and SL as PWM signals, respectively, from the PWM controller 30 such that each MOS transistor is turned "on" and "off" alternately by the high frequency wave pulses SH and SL. As shown in FIG. 2(c), during the period when the PMOS (QP1) is "on" and the NMOS (QN1) is "off", load current based on D.C. voltage VIN (=VDD) from the power source is flown to the stabilized capacitance C0 via the coil L1 such that the intermediate node potential VMA is equal to D.C. current VIN (=VDD), while, during the period when the PMOS (QP1) is "off" and the NMOS (QN1) is "on", declining to the level slightly lower than the reference potential VSS (=GND), thereafter rising to intersect with VSS level at P point and rising further to the level over VSS (=GND).

Figure 3:
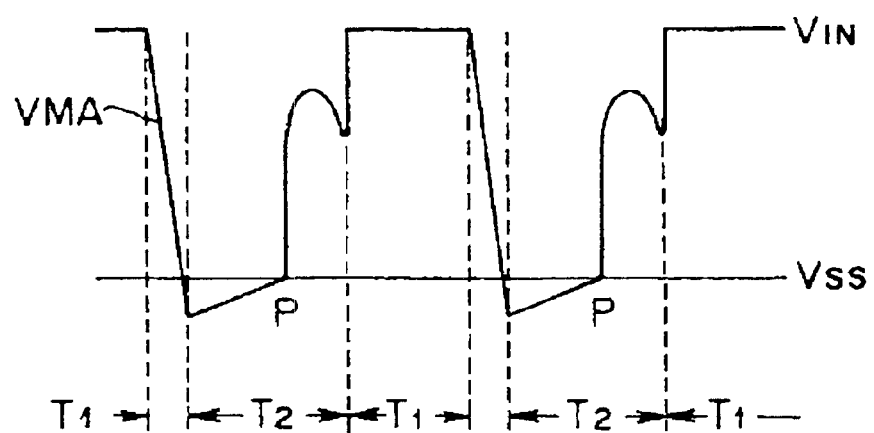
FIG. 3 is a magnified diagram of FIG. 2(c).
Figure 4:
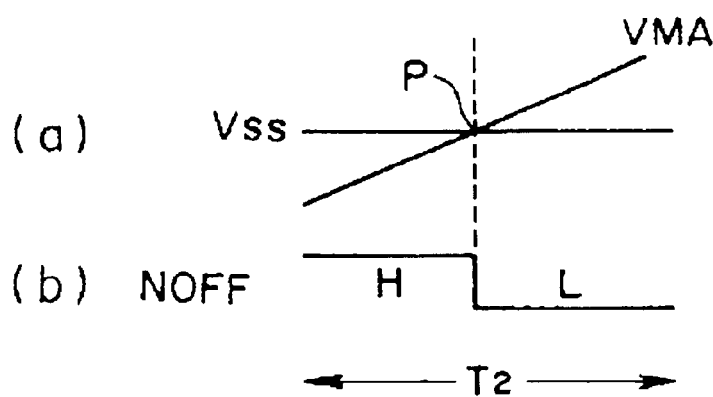
FIG. 4 is a timing diagram showing relationship between reference potential VSS, intermediate node potential VMA and detection signal NOFF from detection circuit.

The voltage change in VMA during the "off" period of the PMOS (QP1) is in the manner shown as in FIG. 3. During the NMOS "on" period T2 after NMOS (QN1) is turned "on" while PMOS (QP1) is "off", VMA undershoots to the potential lower than the VSS level and rises over the VSS level, returning from the undershot state. Then, during the period T1 when the PMOS (QP1) is "on", the intermediate node potential VMA is kept regularly equal to VIN (=VDD).

As shown in FIG. 4(a) and (b), the detection circuit 31 outputs a high level signal (H) when the intermediate node potential VMA is lower than the reference potential VSS and a low level signal (L) when VMA rises over the VSS level, as detection signal NOFF during the above period T2.

When the output driver 32 receives the detection signal NOFF shown in FIG. 4(b) during the period T2, the level of the pulse SL shown as chain double-dashed line in FIG. 2(b) is reduced to a low level at the timing of the P point, and as a result, the pulse width of the pulse SL is changed to the one shown as a full line in FIG. 2(b). Thus, though the period when the NMOS (QN1) is turned "on" becomes short, there is a great advantage of avoiding power loss due to reverse current flowing from the intermediate node K (hence, stabilized capacitance C0) to the reference potential VSS caused by keeping the NMOS (QN1) "on".

Figure 5:
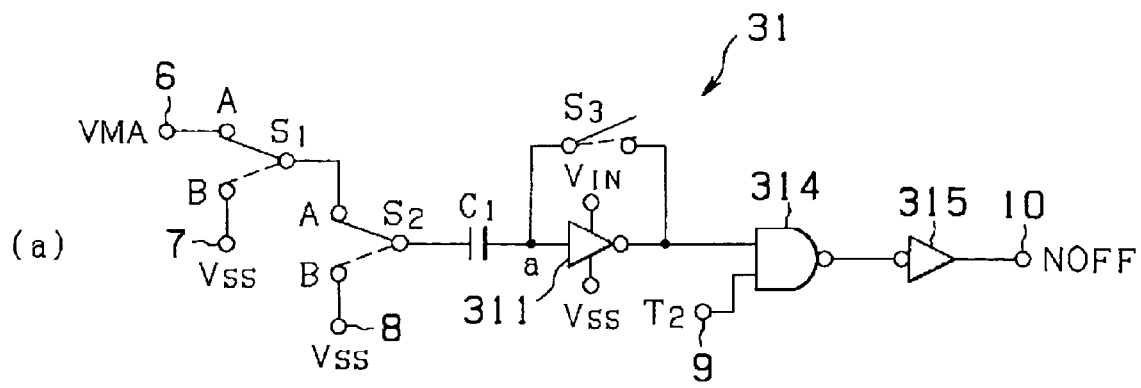
FIG. 5 is a diagram showing a constitutional example of detection circuit.

FIG. 5 shows a constitutional example of the above detection circuit 31. FIG. 5(a) shows a circuit diagram and FIG. 5(b) is a diagram showing times for changing-over switches S1 through S3 in FIG. 5(a). Here, an example in which a one stage inverter (311) is used is shown.

The detection circuit 31 includes an input terminal 6 for the intermediate node potential VMA, a switch S1, a switch S2, a coupling capacitor C1, an inverter 311, a switch S3, a NAND gate 314, an inverter 315, and an output terminal 10 for detection signal NOFF. The inverter 311 is driven by using the same voltage as the power source voltage VIN (=VDD) and reference potential VSS. The switches S1 and S2 are switches for changing over two inputs and having input terminals A and B. The switch S3 is a switch for changing over "on" and "off" and is connected in parallel with the inverter 311 between the input terminal and output terminal of it.

The intermediate node potential VMA is input to the input terminal 6, and during the period T2, is supplied to an input point "a" of the inverter 311 via the switches S1, S2 and further the coupling capacitor C1. At that time, the switch S3 is opened such that the signal from the input point "a" is inverted and is input to one input terminal of the NAND gate 314 so as to form NAND with high level signal showing the period T2 and given to the other input terminal 9 of the NAND gate 314. Then, the signal is output to the output terminal 10 as detection signal NOFF via the inverter 315. Further, the input terminal of the coupling capacitor C1 is turned to be VSS level and the above switch S3 is closed during the period T1.

Here, the switch S1 is installed in order to keep the output terminal of the switch S1 on the VSS level lest the power source voltage VIN should affect subsequent stages via the output terminal of the switch S1 when input voltage VMA is equal to VIN (=VDD) during the period T1.

In addition, the above NAND gate 314 and the inverter 315 are the gates that are added in order to further digitize the signal produced by binarizing the change of the analog signal VMA at the inverter 311 during the period T2.

One of the above intermediate node potential VMA input to the terminal 6 and the reference potential VSS given to the terminals 7 and 8 is input according to the change-over of the switches S1 and S2 corresponding to the periods T1 and T2 so as to be added to the input terminal of the coupling capacitor C1.

Figure 6:
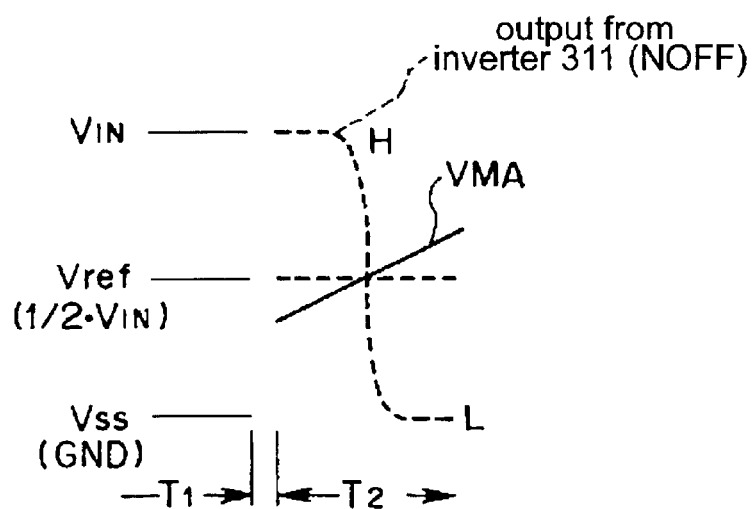
FIG. 6 is a diagram showing detection signal NOFF in FIG. 5.

Therefore, first, VSS is input and input/output of the inverter 311 is shorted during the period T1 such that the execution level at the input point "a" of the inverter 311 is settled at VIN/2 (=Vref). After this state is set, next, VMA undershoots to the potential a bit lower than VSS when the NMOS (QN1) is turned "on" during the timing of the period T2 as shown in FIG. 6. Since this potential is transmitted to the input point "a" of the inverter 311 by capacitance coupling of the capacitor C1, the input level of the potential at the input point "a" of the inverter 311 is lower than the threshold Vref (=VIN/2) at this time such that inversion output from the inverter 311 turns high (H). Subsequently, the inversion output from the inverter 311 turns low (L) when VMA surpasses Vref.

Namely, the detection signal NOFF obtained from the output terminal 10 is detected as converting from high to low in accordance with the change of VMA in terms of the VSS level during the period T2.

Figure 7:
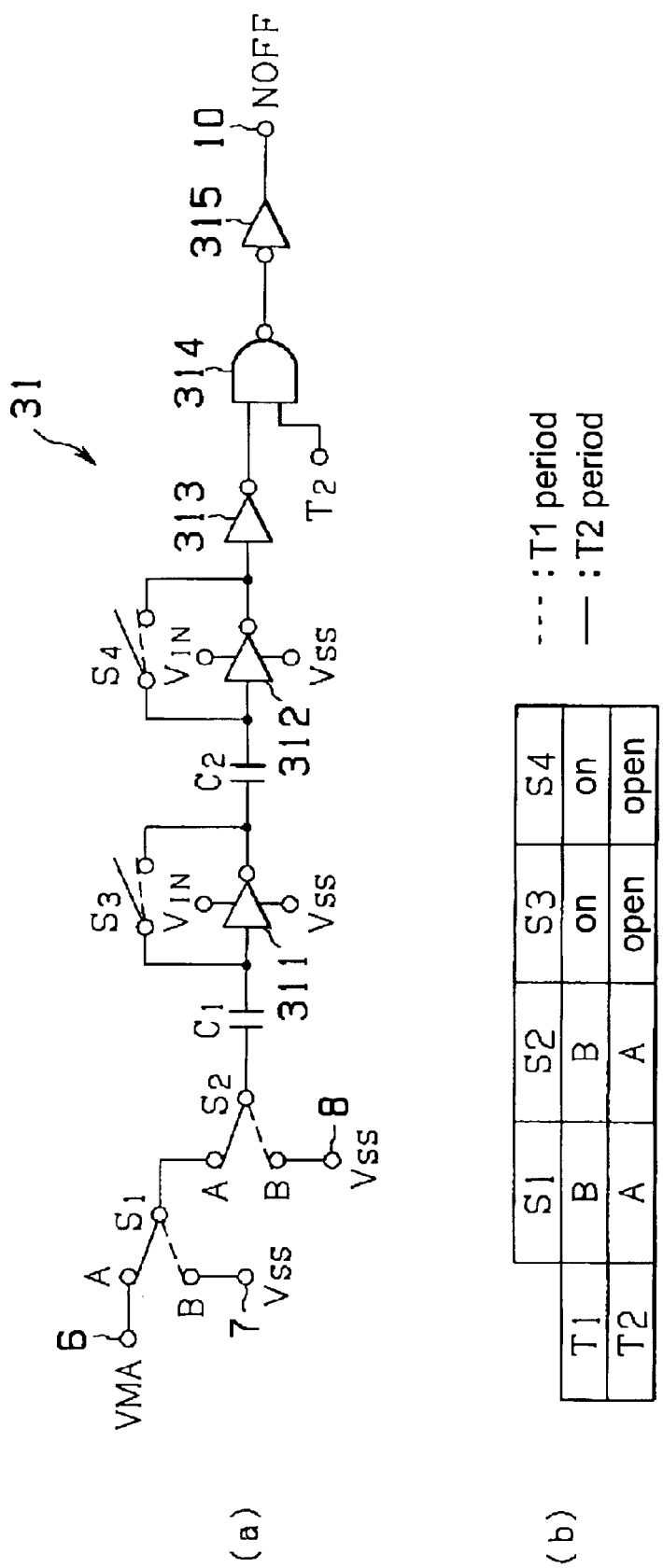
FIG. 7 is a diagram showing another constitutional example of detection circuit.

FIG. 7 shows a second constitutional example of the above detection circuit 31. FIG. 7(a) shows a circuit diagram and FIG. 7(b) is a diagram showing the time for change-over for switches S1 through S4 in FIG. 7(a). Here, an example in which two stages inverters (311, 312) are used is shown. The switches S1 and S2 are two switches for changing over two inputs and having input terminals A and B. The switch S3 is a switch for changing over on and off.

In the example shown in FIG. 7, the coupling capacitor C2, the inverter 312 and the inverter 313 are further added to the subsequent stage of the inverter 311 in FIG. 5 and the switch S4 is connected in parallel with the inverter 312 between the input terminal and output terminal of it. The inverter 312 is driven by using the same voltage as the power source voltage VIN (=VDD) and the reference potential VSS in the same manner as the inverter 311. The inverter 313 connected between the inverter 312 and the above NAND gate 314 is inserted in order to ensure consistency of signal polarity with the circuit shown in FIG. 5. Here, the above NAND gate 314 and the inverter 315 are the gates that are added in order to further digitize the signal produced by binarizing the change of the analog signal VMA at the inverter 311 and the inverter 312 during the period T2 in the same manner as the circuit shown in FIG. 5.

Therefore, though the circuit shown in FIG. 7 has a configuration of two stage inverters to obtain more gains, the operation of it is in the same manner as the circuit shown in FIG. 5.

Figure 8:
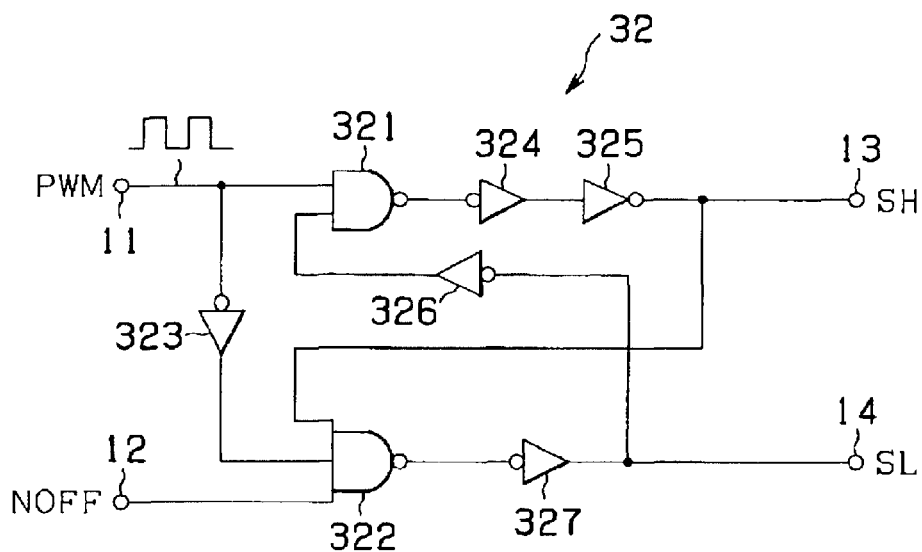
FIG. 8 is a diagram showing a constitutional example of output driver.

FIG. 8 is a circuit diagram showing the constitutional example of the above output driver 32.

In FIG. 8, the output driver 32 includes an input terminal 11 to which the PWM signal from the PWM circuit 33 is input, an input terminal 12 to which the detection signal NOFF (see FIG. 4(b)) from the detection circuit 31 is input, a NAND gate for two inputs 321, a NAND gate for three inputs 322, an inverter 323, an inverter 324, an inverter 325, an inverter 326, an inverter 327, an output terminal 13 outputting the high frequency wave pulse SH to be a gate signal from PMOS (QP1), and an output terminal 14 outputting the high frequency wave pulse SL to be a gate signal from NMOS (QN1).

According to the configuration shown in FIG. 8, the high frequency wave pulses SH and SL as shown in FIG. 2(a) and FIG. 2(b) respectively are output to the output terminal 13 and the output terminal 14 respectively. When the high frequency wave pulse SL rises from a low level to a high level with a bit of a delay against the rising of the high frequency wave pulse SH after the SH rises from a low level to a high level, the NMOS (QN1) being turned "on" thereby, the intermediate node potential VMA declines from the power source voltage VIN (=VDD) to undershoot to a potential lower than the reference potential VSS as shown in FIG. 2(c). Then, the high frequency wave pulse SL is turned to be a low level at the time (the timing at cross point P, namely, the timing when the detection signal NOFF falls) when the intermediate node potential VMA returns from the undershot state to the reference potential VSS, and accordingly, the NMOS (QN1) is turned "off" to disconnect the connection between the intermediate node K and VSS side. Thereby, unnecessary power consumption caused by current flowing from the intermediate node K to the VSS side can be avoided.

According to the first embodiment described above, in a unit of CMOS inversion circuit, after the PMOS (QP1) is turned "off", the NMOS (QN1) is turned "on" such that the potential VMA at the intermediate node K declines and undershoots to the potential lower than the reference potential VSS. Then, if the potential VMA returns to the reference potential VSS from the undershooting state, this triggers turning "off" the NMOS (QN1) (namely, making the gate voltage of the NMOS (QN1) low level). This can avoid unnecessary power consumption due to current flowing from the intermediate node K side to the reference potential VSS side when the intermediate node potential returns from the undershot state and surpasses the reference potential level. Further, the timing when the intermediate node potential VMA returns from the undershot state and surpasses the reference potential level VSS can be detected at a high speed by the inverter circuit having a predetermined threshold so as to quickly turn "off" NMOS (QN1) without delay. Therefore, even when the zero point position where the intermediate node potential VMA returns from the undershooting state to the reference potential VSS fluctuates (described later) due to fluctuation of a load current, the timing when the intermediate node potential VMA surpasses the reference potential VSS level can be certainly detected to attain an accurate and high speed operation.

Meanwhile, the way of the voltage change of the VMA during the "off" period of the PMOS (QP1) changes depending on the magnitude of a load (not shown in the drawing) (namely, the magnitude of load current) connected to the output terminal 4 such that the point P (referred to as zero point position hereafter), which is the point where the VMA intersects with the VSS level, moves right or left according to the magnitude of a load. Namely, as shown by three upward lines in FIG. 9(a), the voltage changed portion (a period T2), which intersects with VSS level, becomes a high changed line (a line including P1) when a load is light and a low changed line (a line including P2) when load is heavy. Here, the changed line including P0 shows the one in the case where the load is intermediate between light and heavy. In the configuration of FIG. 1 in which the pulse width of the gate pulse SL input to NMOS is controlled after a potential change at the point P is detected, the VMA becomes a signal of which the waveform drastically rises after the point P.

Figure 9:
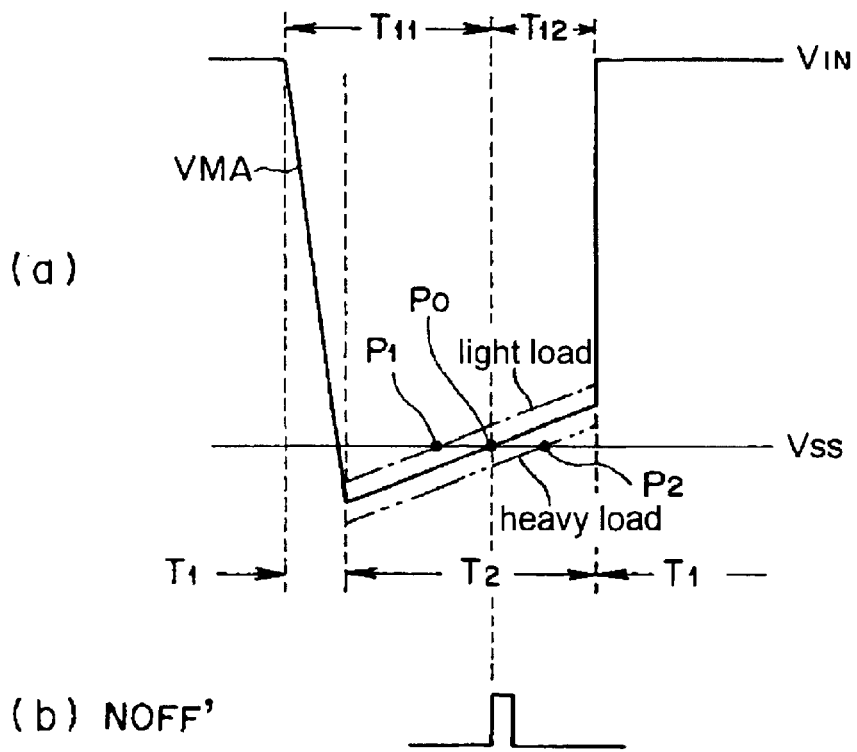
FIG. 9 is a diagram showing relationship between changes of intermediate node potential VMA and the magnitude of load and zero point position detection signal.

Therefore, if a zero point position P (for example, P0, P1 or P2) is detected, thereafter a current feedback signal being produced on the basis of the detection signal NOFF (see FIG. 9(b)) at the zero point position and being fed back to the error amplifier 40, enabling feedback control with rapid response to even drastic fluctuation of a load. Or, the magnitude of a load may be detected by calculating the ratio of time T11 and time T12 to the "off "period of the PMOS (QP1) shown in FIG. 9(a) instead of detecting the zero point position P (intersection with VSS level).

Figure 10:
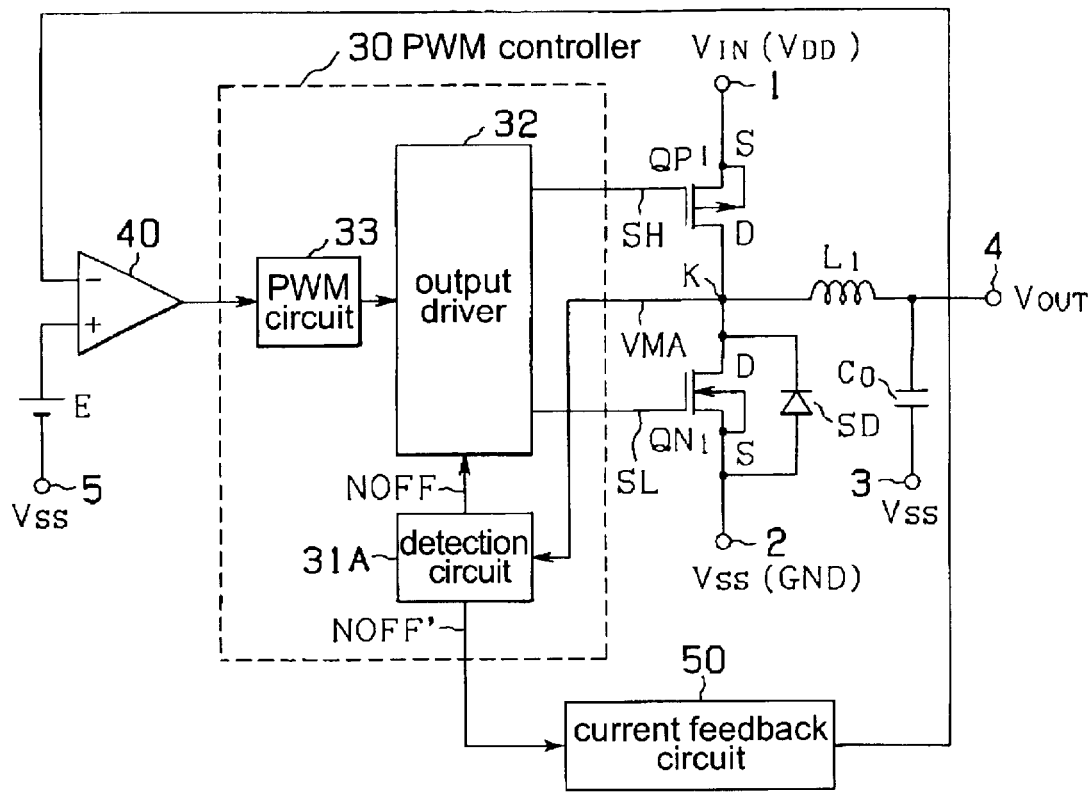
FIG. 10 is a diagram showing a configuration of the power source circuit according to the second embodiment of the present invention.

FIG. 10 shows the configuration of the power source circuit according to the second embodiment of the present invention.

Since the main part of the present embodiment has the same configuration as that of the embodiment of FIG. 1, only the different points from the configuration of FIG. 1 will be described. The same parts in FIG. 10 as those in FIG. 1 have the same signs as those in FIG. 1.

In FIG. 10, as a means for current feedback control detecting the change of the load current, feeding back to PWM circuit thereby, it functions that the magnitude of the load current is detected by detecting the above zero point position (obtaining the detection signal NOFF in FIG. 9(b)) on the basis of the result of detection at the detection circuit 31 in FIG. 1 (NOFF in FIG. 4(b)) and fed back to PWM circuit 33 via error amplifier 40.

The different point of FIG. 10 from the constitution in FIG. 1 is to provide a detection circuit 31A and a current feedback circuit 50. In the detection circuit 31A, when the NMOS (QN1) is turned "on" during the "off" period of the PMOS (QP1), the intermediate node potential VMA declines from the power source voltage VIN (=VDD) to undershot to a potential lower than the reference potential VSS. Then, it detects the timing (zero point position) when the VMA returns from the undershot state to the VSS, (or, may detect the time ratio of time T11 to time T12 during the "off" period of the PMOS (QP1) shown in FIG. 9(a) as described above) and outputs at least a zero point position detection signal NOFF. Further, the current feedback circuit 50 produces a current feedback signal according to the magnitude of a load on the basis of the zero point position detection signal NOFF. Thus, the power source circuit of FIG. 1 functions of producing a current feedback signal according to the magnitude of the load so as to suppress the fluctuation of the regulator output.

Otherwise, the above current feedback circuit 50 may function by producing a current feedback signal so as to feed back current by using the zero point position signal NOFF only when load current is larger than a predetermined value. Thus, the power source circuit of FIG. 1 may function by producing a current feedback signal so as to suppress the fluctuation of the regulator output only when the load current surpasses a predetermined value such that simple feedback control is realized.

In addition, the above detection circuit 31A may further include the same function as that of the detection circuit 31 of FIG. 1. Namely, the above detection circuit 31A may detect the state where the potential VMA at the above intermediate node K returns from undershot state to rise over the VSS level after undershot to the level lower than the VSS level when the NMOS (QN1) is turned "on" during the "off" period of the PMOS (QP1) and output the detector signal NOFF (see FIG. 4(b)). Further, the detection circuit 31A may detect the timing when the intermediate node potential VMA returns from the undershot state to the reference potential VSS and output the zero point detection signal NOFF. Thus, the power source circuit of FIG. 10 has two functions; one is to turn the NMOS (QN1) "off" when the NMOS (QN1) is "on" by controlling the output driver 32 so as to suppress power consumption and the other is to produce a current feedback signal according to the magnitude of the load so as to suppress the fluctuation of the regulator output (or, function to produce current feedback signal so as to suppress the fluctuation of regulator output only when load current surpasses the predetermined value).

Figure 11:
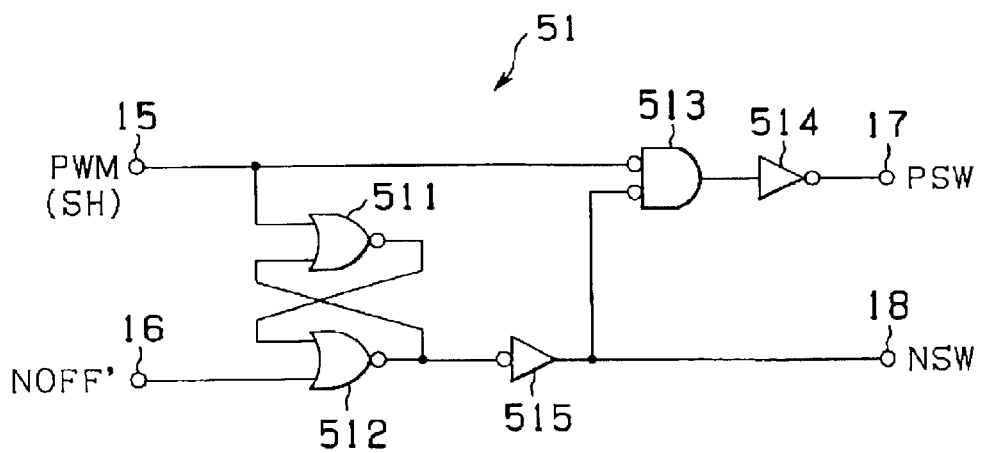
FIG. 11 is a circuit diagram showing the first circuit constituting current feedback circuit in FIG. 10.
Figure 12:
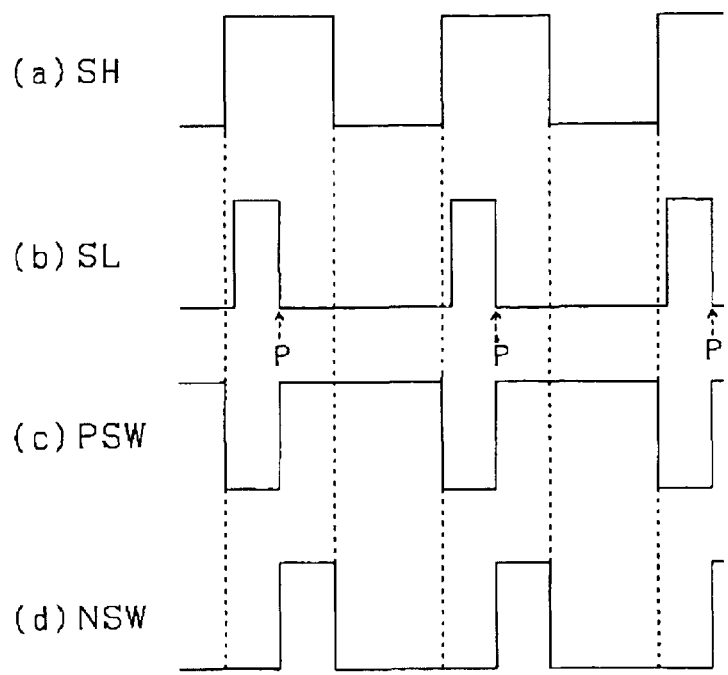
FIG. 12 is a timing diagram showing relationship between PWM signals SH, SL to be input to CMOS inversion circuit and PSW/NSW signal made in the circuit of FIG. 11.
Figure 13:
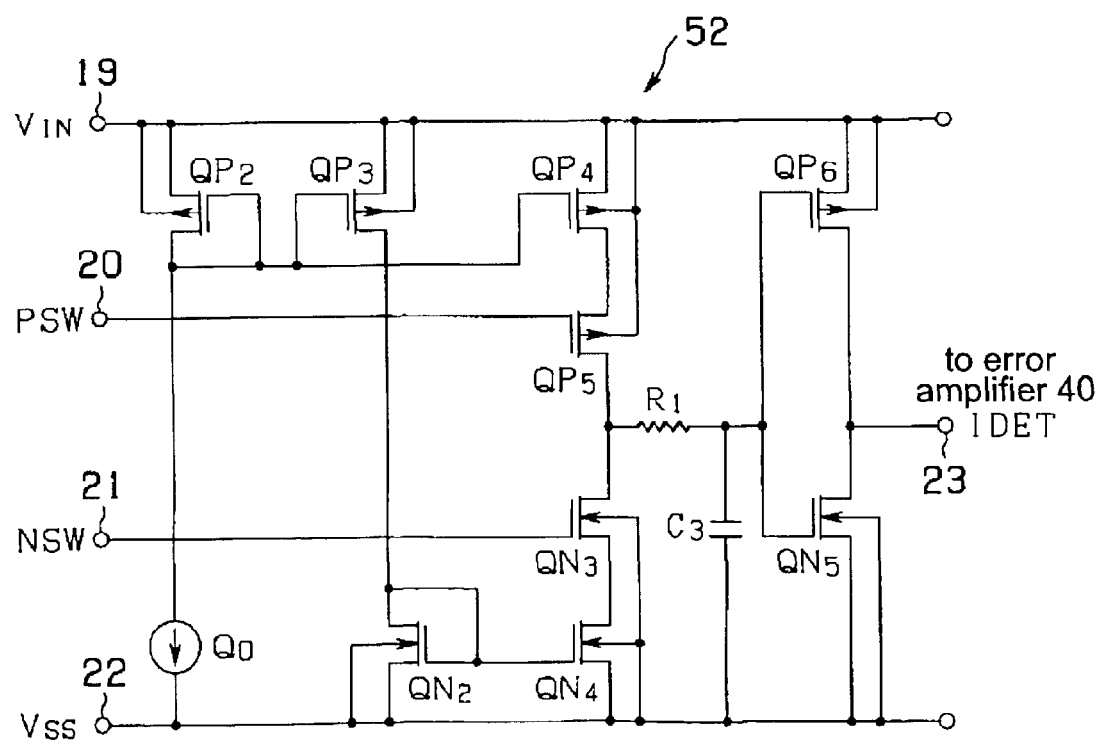
FIG. 13 is a circuit diagram showing the second circuit constituting current feedback circuit in FIG. 10.
Figure 14:
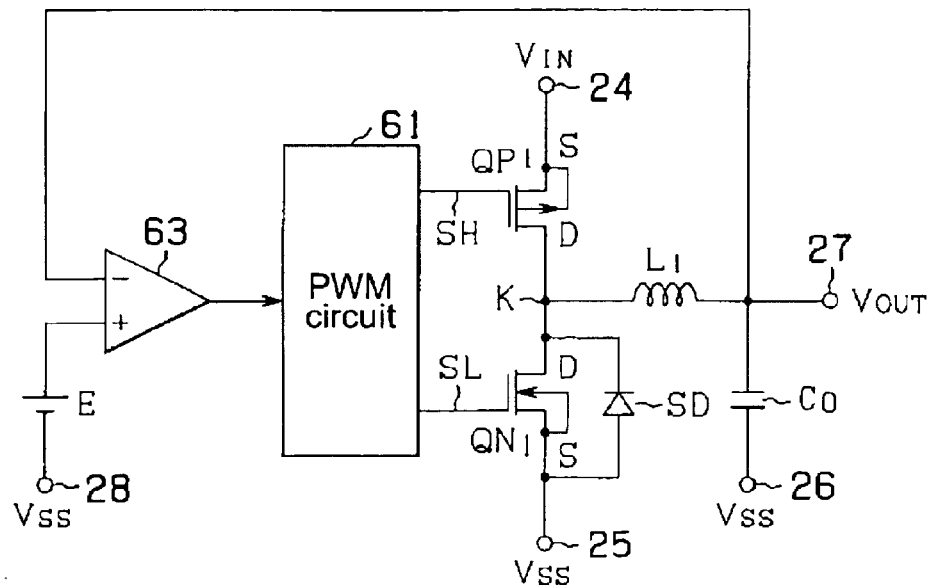
FIG. 14 is a diagram showing a configuration of a conventional example of power source circuit.
Figure 15:
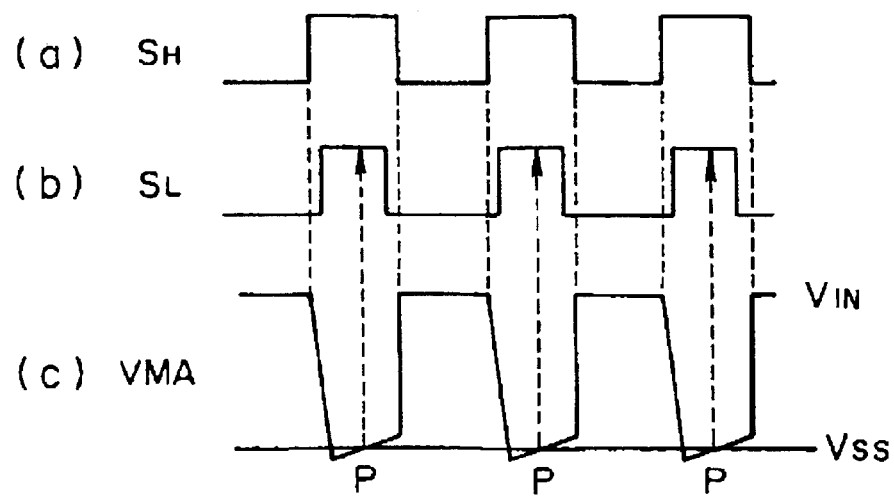
FIG. 15 is a timing diagram showing changes of PWM signals SH, SL and intermediate node potential VMA in FIG. 14.

The above current feedback circuit 50 includes a first circuit 51 as shown in FIG. 11 producing a PSW/NSW signal (see FIG. 12(c) and FIG. 12(d)) by using the above zero point detection signal NOFF from the above detection circuit 31A; and a second circuit 52 as shown in FIG. 13 detecting the fluctuation of the load current by using the PSW/NSW signal (see FIG. 12(c) and FIG. 12(d)).

The first circuit 51 shown in FIG. 11 includes an input terminal 15 to which the PWM signal (almost the same as the high frequency wave pulse SH) from the PWM circuit 33 is input, an input terminal 16 to which the above zero point position detection signal NOFF (see FIG. 9(b)) is input from the detection circuit 31A, a NOR gate for two inputs 511, a NOR gate for two inputs 512, a NAND gate for two inputs 513, an inverter 514, an inverter 515, an output terminal 17 outputting the PSW signal showing the period from the start of the "off" period of the PMOS (QP1) to the zero point position, and an output terminal 18 outputting the NSW signal showing the period from the zero point position to the end of the "off" period of the PMOS (QP1). Each of the NOR gate 511 and the NOR gate 512 feeds back its output as the input to the other NOR gate so as to configure a R-S NOR latch.

FIG. 12 shows the timing diagram showing the relationship between the switching pulse SH, the switching pulse SL input to the CMOS inversion circuit and the PSW/NSW signal produced at the circuit 51 in FIG. 11. The waveforms shown in FIG. 12(a) and FIG. 12(b) are the same as those shown in FIG. 2(a) and FIG. 2(b) respectively, therefore the pulse SL falls to a low level at the zero point position P. FIG. 12(c) shows the PSW signal which is low in the period from rising point of the pulse SH to the zero point position P and is high in the other period. FIG. 12(d) shows the NSW signal which is high in the period from the zero point position P to the falling point of the pulse SH and is low in the other period.

The circuit 52 shown in FIG. 13 includes an input terminal 19 to which D.C. voltage VIN (=power source voltage VDD) is supplied, an input terminal 20 to which the PSW signal (see FIG. 12(c)) from the circuit 51 of FIG. 11 is input, an input terminal 21 to which the NSW signal (see FIG. 12(d)) from the circuit 51 of FIG. 11 is input, and an input terminal 22 to which the reference potential VSS is supplied. The circuit also includes a PMOS (QP2), a PMOS (QP3), which configures a constant current circuit (current mirror), a PMOS (QP4) configuring a constant current circuit (current mirror) with a PMOS (QP2), a constant current supply Q0, a NMOS (QN2), and a NMOS (QN4) which configure a constant current circuit (current mirror), and a CMOS inverter including a PMOS (QP5) and a NMOS (QN3) which are connected in series between the PMOS (QP4) and the NMOS (QN4). The circuit further includes a integration circuit including resistor R1, connected between the series connection point of the PMOS and the NMOS of the CMOS inverter and the VSS line, and the capacitor C3, a CMOS inverter of an output stage to which the output from the integration circuit is input and which includes a PMOS (QP6) and a NMOS (QN5) which are connected in series between the VIN line and the VSS line, and an output terminal 23 which is connected to the common drain of the PMOS (QP6) and the NMOS (QN5) and outputs the current feedback signal of which pulse width corresponds to the magnitude of a load to the error amplifier 40.

Figure 16:
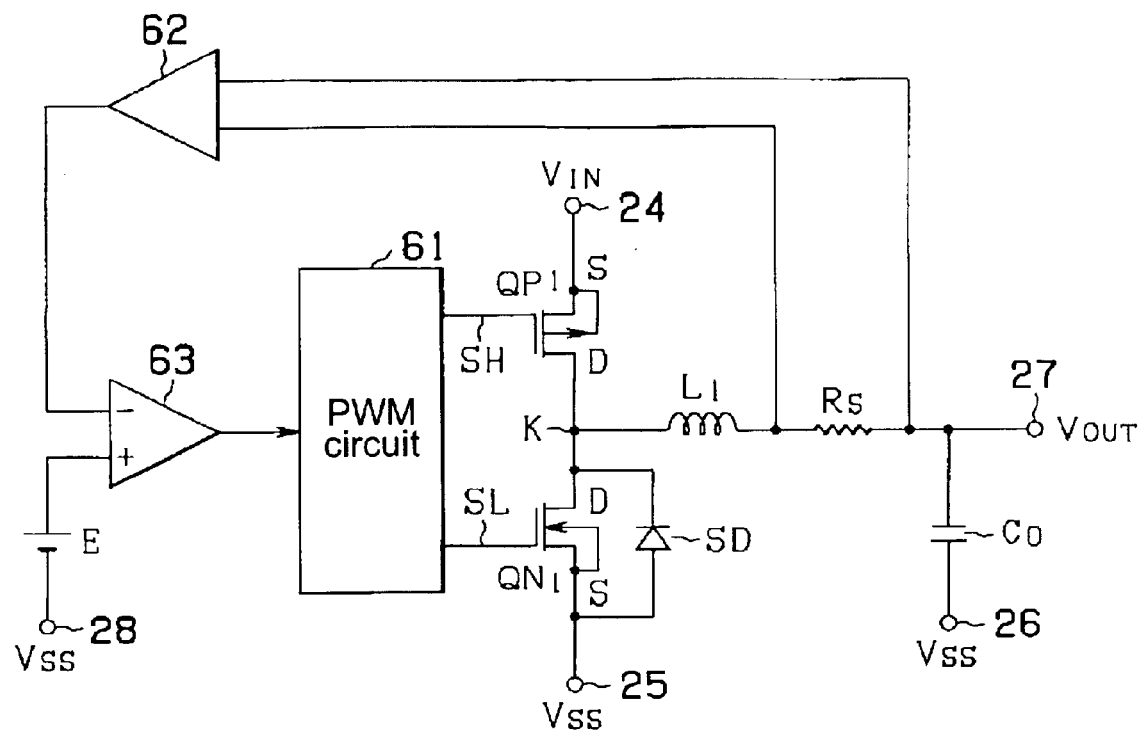
FIG. 16 is a diagram showing a configuration of another conventional example of power source circuit.

According to the second embodiment described above, a resistor for current detection included in a conventional circuit is not required as the conventional circuit shown in FIG. 16 such that the large increase in the number of component parts of resistors and the decrease in efficiency due to power loss of the resistors for detection can be avoided.

The present invention is not limited to the above embodiments and various modification of each embodiment can be available within the sprit of the invention.

Here, though the CMOS integrated circuit provided with PMOS and NMOS as the high side transistor and the low side transistor respectively is described in the above embodiments, the present invention is not limited to this. The CMOS circuit may be provided with NMOS as both high side and low side transistors and the pulse SH may be inverted. Otherwise, PMOS transistors may be used for both high side and low side transistors and the pulse SL may be inverted.

As described above, according to the present invention, the power source circuit which can reduce power consumption and respond to load fluctuations at high speeds with a decrease in the number of component parts and improved efficiency can be realized in a power source circuit of synchronous rectification systems using a CMOS integrated circuits.

What is claimed is:

1. A power source circuit comprising:

a CMOS inversion circuit including a P-channel transistor and an N-channel transistor connected in series between a power source voltage and a reference potential, the transistors being alternately turned "on" or "off" by a PWM signal input to a gate of each transistor with an "on" period of the transistors being controlled, and being capable of outputting a D.C. voltage to a load via a stabilized capacitance;

a detection circuit outputting a detection signal showing a state where an intermediate node potential at a connection point of the P-channel transistor and the N-channel transistor surpasses the reference potential after undershooting to a level lower than the reference potential when the N-channel transistor is turned "on" during the "off" period of the P-channel transistor;

means for obtaining an error signal by comparing an output from the CMOS inversion circuit with a predetermined reference voltage value; and means for producing a PWM signal of which a pulse width is controlled by the error signal, supplying the PWM signal to each gate of the CMOS inversion circuit, controlling the PWM signal supplied to the gate of the N-channel transistor among PWM signals supplied to the CMOS inversion circuit by the detection signal from the detection circuit, and turning "off" an "on" state of the N-channel transistor.

2. The power source circuit claimed in claim 1, wherein the detection circuit comprises:

a first switch being capable of switching the intermediate node potential to the reference potential selectively, and selecting and outputting the intermediate node potential during the "on" period of the N-channel transistor;

a coupling capacitor connected to an output terminal of the first switch in series;

an inverter connected to the output terminal of the coupling capacitor in series, driven by using the same voltage as the power source voltage and the reference potential, inputting and inverting the intermediate node potential during the "on" period of the N-channel transistor, and outputting the intermediate node potential as the detection signal; and a second switch connected to input and output terminals of the inverter in parallel, being turned "on" during the "on" period of the P-channel transistor, and being turned "off" during the "on" period of the N-channel transistor.

3. A power source circuit comprising:

a CMOS inversion circuit including a P-channel transistor and an N-channel transistor connected in series between a power source voltage and a reference potential, the transistors being alternately turned "on" or "off" by a PWM signal input to a gate of each transistor with an "on" period of the transistors being controlled, and being capable of outputting D.C. voltage to a load via a stabilized capacitance;

a detection circuit detecting a zero point position when a potential at a connection point of the P-channel transistor and the N-channel transistor returns to the reference potential after undershooting to a level lower than the reference potential, and outputting a detection signal that shows at least the zero point position when the N-channel transistor is turned "on" during the "off" period of the P-channel transistor;

a current feedback circuit producing a current feedback signal according to a magnitude of a load current based on the detection signal showing the zero point position;

means for obtaining an error signal by comparing the current feedback signal with a predetermined reference voltage value; and means for producing a PWM signal of which a pulse width is controlled by the error signal, and supplying the PWM signal to each gate of the CMOS inversion circuit.

4. A power source circuit comprising:

a CMOS inversion circuit including a P-channel transistor and an N-channel transistor connected in series between a power source voltage and a reference potential, the transistors being alternately turned "on" or "off" by a PWM signal input to a gate of each transistor with an "on" period of the transistors being controlled, and being capable of outputting D.C. voltage to a load via a stabilized capacitance;

a detection circuit outputting a first detection signal showing the state where potential at a connection point of the P-channel transistor and the N-channel transistor surpasses the reference a potential after undershooting to a level lower than the reference potential, at the same time, detecting a zero point position when the potential at the connection point returns to the reference potential after undershooting to the level lower than the reference potential, and outputting a second detection signal that shows at least the zero point position when the N-channel transistor is turned "on" during the "off" period of the P-channel transistor;

a current feedback circuit producing a current feedback signal according to a magnitude of a load current based on the second detection signal showing the zero point position;

means for obtaining an error signal by comparing the current feedback signal with a predetermined reference voltage value; and means for producing a PWM signal of which a pulse width is controlled by the error signal, supplying the PWM signal to each gate of the CMOS inversion circuit, at the same time, controlling the PWM signal supplied to the gate of the N-channel transistor among PWM signals supplied to the CMOS inversion circuit by the first detection signal from the detection circuit, and turning "off" an "on" state of the N-channel transistor.

5. A power source circuit comprising:

a DC-DC conversion circuit including a high side transistor and a low side transistor connected in series between a power source voltage and a reference potential, the transistors being alternately turned "on" or "off" by a PWM signal input to a gate of each transistor with an "on" period of the transistors being controlled, and being capable of outputting a D.C. voltage to a load via a stabilized capacitance;

a detection circuit outputting a detection signal showing a state where an intermediate node potential at a connection point of the high side transistor and the low side transistor surpasses the reference potential after undershooting to a level lower than the reference potential when the low side transistor is turned "on" during the "off" period of the high side transistor; and means for controlling the PWM signal supplied to the gate of the low side transistor among PWM signals supplied to the DC-DC conversion circuit by the detection signal from the detection circuit, and turning "off" an "on" state of the low side transistor.

6. A power source circuit comprising:

a DC-DC conversion circuit including a high side transistor and a low side transistor connected in series between a power source voltage and a reference potential, turning "on" or "off" the transistors being alternately turned "on" or "off" by a PWM signal input to a gate of each transistor with an "on" period of the transistors being controlled, and being capable of outputting a D.C. voltage to a load via a stabilized capacitance;

a detection circuit outputting a detection signal showing a state where an intermediate node potential at a connection point of the high side transistor and the low side transistor surpasses the reference potential after undershooting to a level lower than the reference potential when the low side transistor is turned "on" during the "off" period of the high side transistor;

means for obtaining an error signal by comparing the output from the DC-DC conversion circuit with a predetermined reference voltage value; and means for producing a PWM signal of which a pulse width is controlled by the error signal, supplying the PWM signal to each gate of the DC-DC conversion circuit, controlling the PWM signal supplied to the gate of the low side transistor among PWM signals supplied to the DC-DC conversion circuit by the detection signal from the detection circuit, and turning "off" an "on" state of the low side transistor.

7. The power source circuit claimed in claim 5, wherein the detection circuit comprises:

a first switch being capable of switching the intermediate node potential to the reference potential selectively, and selecting and outputting the intermediate node potential during an "on" period of the low side transistor;

a coupling capacitor connected to an output terminal of the first switch in series;

an inverter connected to the output terminal of the coupling capacitor in series, driven by using the same voltage as the power source voltage and the reference potential, inputting and inverting the intermediate node potential during the "on" period of the low side transistor, and outputting the intermediate node potential as the detection signal; and a second switch connected to input and output terminals of the inverter in parallel, being turned "on" during the "on" period of the high side transistor, and being turned "off" during the "on" period of the low side transistor.

8. A power source circuit comprising:

a DC-DC conversion circuit including a high side transistor and a low side transistor connected in series between a power source voltage and a reference potential, turning "on" or "off" the transistors being alternately turned "on" or "off" by a PWM signal input to a gate of each transistor with an "on" period of the transistors being controlled, and being capable of outputting a D.C. voltage to a load via a stabilized capacitance;

a detection circuit detecting a zero point position when a potential at a connection point of the high side transistor and the low side transistor returns to the reference potential after undershooting to a level lower than the reference potential, and outputting a detection signal that shows at least the zero point position when the low side transistor is turned "on" during the "off" period of the high side transistor;

a current feedback circuit producing a current feedback signal according to a magnitude of a load current based on the detection signal showing the zero point position;

means for obtaining an error signal by comparing the current feedback signal with a predetermined reference voltage value; and means for producing a PWM signal of which a pulse width is controlled by the error signal, and supplying the PWM signal to each gate of the DC-DC conversion circuit.

9. A power source circuit comprising:

a DC-DC conversion circuit including a high side transistor and a low side transistor connected in series between a power source voltage and a reference potential, the transistors being alternately turned "on" or "off" by a PWM signal input to a gate of each transistor with an "on" period of the transistors being controlled, and being capable of outputting a D.C. voltage to a load via a stabilized capacitance;

a detection circuit outputting a first detection signal showing a state where a potential at a connection point of the high side transistor and the low side transistor surpasses the reference potential after undershooting to a level lower than the reference potential, at the same time, detecting a zero point position when the potential at the connection point returns to the reference potential after undershooting to the level lower than the reference potential, and outputting a second detection signal that shows at least the zero point position when the low side transistor is turned "on" during the "off" period of the high side transistor;

a current feedback circuit producing a current feedback signal according to a magnitude of a load current based on the second detection signal showing the zero point position;

means for obtaining an error signal by comparing the current feedback signal with a predetermined reference voltage value; and means for producing a PWM signal of which a pulse width is controlled by the error signal, supplying the PWM signal to each gate of the DC-DC conversion circuit, at the same time, controlling the PWM signal supplied to the gate of the low side transistor among the PWM signals supplied to the DC-DC conversion circuit by the first detection signal from the detection circuit, and turning "off" an "on" state of the low side transistor.

10. The power source circuit claimed according to claim 3, wherein the current feedback circuit implements current feedback by producing the current feedback signal based on the detection signal showing the zero point position only when the magnitude of the load current is larger than a predetermined value.

11. A power source circuit comprising:

a CMOS inversion circuit including a P-channel transistor and an N-channel transistor connected in series between a power source voltage and a reference potential, the transistors being alternately turned "on" or "off" by a PWM signal input to a gate of each transistor with an "on" period of the transistors being controlled, and being capable of outputting a D.C. voltage to a load via a stabilized capacitance;

a detection circuit outputting a detection signal showing a state where an intermediate node potential at a connection point of the P-channel transistor and the N-channel transistor surpasses the reference potential after undershooting to a level lower than the reference potential when the N-channel transistor is turned "on" during the "off" period of the P-channel transistor;

an error amplifier that obtains an error signal by comparing an output from the CMOS inversion circuit with a predetermined reference voltage value; and a PWM circuit and output driver that produce a PWM signal of which a pulse width is controlled by the error signal, supplying the PWM signal to each gate of the CMOS inversion circuit, controlling the PWM signal supplied to the gate of the N-channel transistor among PWM signals supplied to the CMOS inversion circuit by the detection signal from the detection circuit, and turning "off" an "on" state of the N-channel transistor.

12. The power source circuit claimed in claim 11, wherein the detection circuit comprises:

a first switch being capable of switching the intermediate node potential to the reference potential selectively, and selecting and outputting the intermediate node potential during the "on" period of the N-channel transistor;

a coupling capacitor connected to an output terminal of the first switch in series;

an inverter connected to the output terminal of the coupling capacitor in series, driven by using the same voltage as the power source voltage and the reference potential, inputting and inverting the intermediate node potential during the "on" period of the N-channel transistor, and outputting the intermediate node potential as the detection signal; and a second switch connected to input and output terminals of the inverter in parallel, being turned "on" during the "on" period of the P-channel transistor, and being turned "off" during the "on" period of the N-channel transistor.

13. The power source circuit in clam 1 further including a Schottky diode connected between a source and drain of the N-channel transistor.

14. The power source circuit claimed according to claim 4, wherein the current feedback circuit implements current feedback by producing the current feedback signal based on the detection signal showing the zero point position only when the magnitude of the load current is larger than a predetermined value.

15. The power source circuit claimed according to claim 8, wherein the current feedback circuit implements current feedback by producing the current feedback signal based on the detection signal showing the zero point position only when the magnitude of the load current is larger than a predetermined value.

16. The power source circuit claimed according to claim 9, wherein the current feedback circuit implements current feedback by producing the current feedback signal based on the detection signal showing the zero point position only when the magnitude of the load current is larger than a predetermined value.

17. The power source circuit claimed in claim 11, further comprising a PWM controller that controls the output for the CMOS inversion circuit.

18. The power source circuit claimed in claim 11, wherein the transistors have a common drain.

19. The power source circuit claimed in claim 11, further including a coil and a stabilizing capacitance.

20. The power source circuit claimed in claim 11, further including a schottky diode connected between a source and drain of the N-Channel transistor.

\* \* \* \* \*